June 25, 1963  G. FRESIA ET AL  3,095,206
FLEXIBLE TANK TRANSPORT VEHICLE
Filed March 9, 1962  4 Sheets-Sheet 1

INVENTORS
Giulio Fresia &
Aldo Valentinotti

BY Stevens, Davis, Miller & Mosher
ATTORNEYS

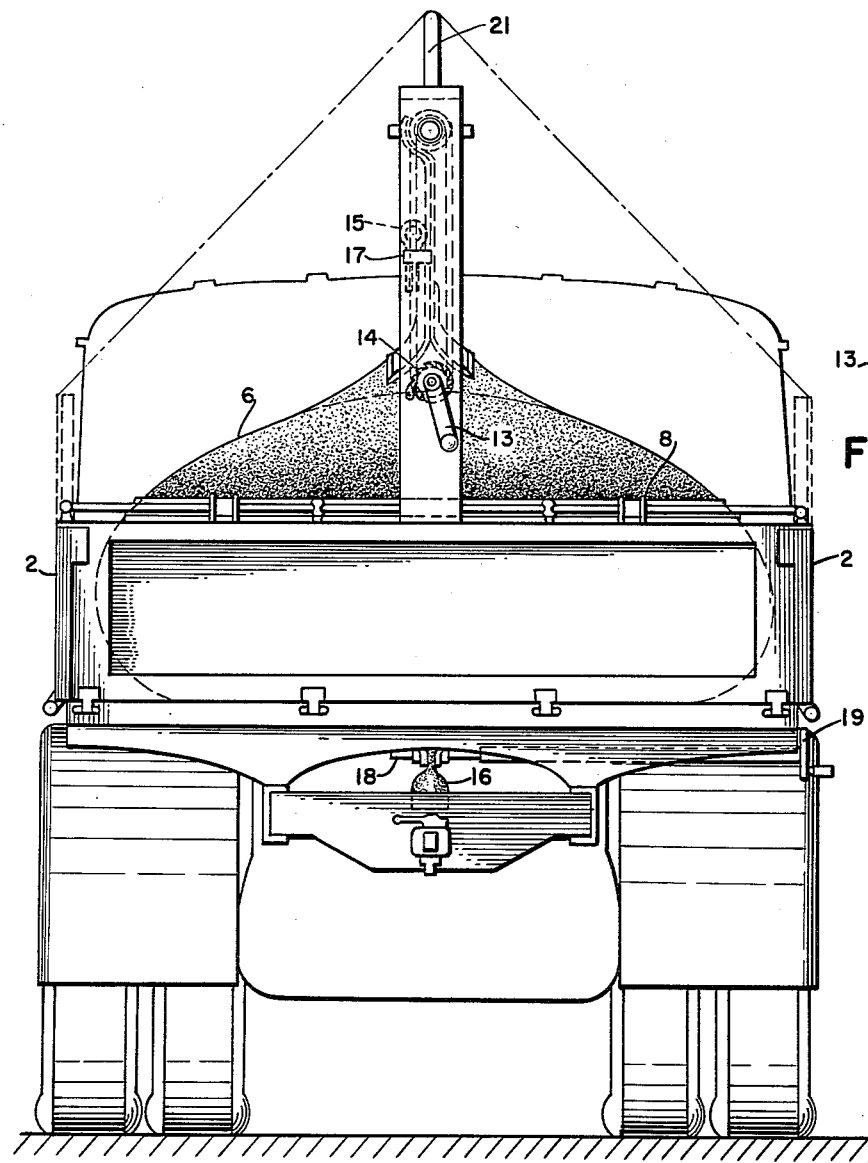

June 25, 1963 G. FRESIA ET AL 3,095,206
FLEXIBLE TANK TRANSPORT VEHICLE

Filed March 9, 1962 4 Sheets-Sheet 4

INVENTORS
Giulio Fresia &
Aldo Valentinotti

BY *Stevens, Davis, Miller & Mosher*
ATTORNEYS

United States Patent Office
3,095,206
Patented June 25, 1963

3,095,206
FLEXIBLE TANK TRANSPORT VEHICLE
Giulio Fresia, Millesimo (Savona), and Aldo Valentinotti, Milan, Italy, assignors to Pirelli, S.p.A., Milan, Italy
Filed Mar. 9, 1962, Ser. No. 178,686
Claims priority, application Italy Mar. 11, 1961
14 Claims. (Cl. 280—5)

The present invention relates to vehicles adapted for the transport of various commodities, including liquid and powdered materials.

It is well known that the use of conventional tank trucks for the transport of liquid or powdered materials is a costly operation, inasmuch as the vehicles so constructed may be used only for delivery from the refinery to the point of distribution or utilization, such as the service station, as in the case of liquid petroleum. The vehicle is ordinarily empty on the return trip.

In order to attempt to devise a less costly operation for the shipper, it has been heretofore proposed to provide the vehicles with envelopes constituting flexible tanks which may be folded after discharge of the liquid or powdered material to permit the use of the truck bed for the transport of bulk or hard goods.

However, the presently proposed method requires the folded tank or envelope to be positioned on the load bearing platform of the truck, thus reducing the space for accommodation of the bulk goods and thereby subjecting the folded tank to damage caused by the random movement of the bulk goods during the return trip.

Moreover the envelopes are presently folded or wound up by hand, so that wrinkles are originated which, during the use of the tank, result in stresses and wear against the loading platform.

It is also to be remarked that said tanks are connected to the vehicle only in their lower part; namely, below the level of the liquid, and this makes it difficult to absorb the oscillations of the liquid mass during the travel.

An important object of the present invention is that of providing a transport vehicle provided with one or more flexible tanks of the above indicated type, in which said tank or tanks, when unloaded, are disposed in such a way as to allow the full use of the loading platform of the vehicle.

A further object of the invention is that of providing a transport vehicle comprising one or more flexible tanks provided with means to firmly fasten the tanks when loaded, and to avoid in this way the displacement and the oscillations of the load during the travel of the vehicle.

A still further object of the invention is that of providing a transport vehicle of the above indicated type, in which the envelope of the flexible tank or tanks is efficiently protected against the shocks or other possible causes of rupture and against the action of the atmospheric agents.

The vehicle according to the present invention is substantially characterized in that it comprises a load bearing platform or bed provided with side boards and a carrying structure able to support, at a level higher than that of the platform, at least a supporting roller to which a flexible envelope, forming the tank, is connected. The flexible tank, during use, rests upon the platform and, after use, can be wound up on the roller in order to allow the full use of the platform for the transport of goods of any kind.

In accordance with the invention, said tank is conveniently provided with an upper strip shaped as a fin, set parallel to the axis of the supporting roller and intended to connect the tank to the roller in order to impart to the tank itself transverse and longitudinal stability.

In this way the roller, besides taking up the empty envelope of the tank, allows its firm anchorage when the tank is filled.

Further features and advantages of the invention will more clearly appear from the following detailed description, made with reference to the attached drawings, given only by way of an embodiment of the invention and which illustrate a vehicle in accordance with the invention, particularly adapted for the transport of liquid petroleum.

In the drawings:

FIGURE 4 is a rear elevational view of the vehicle showing in phantom lines details of the tank and roller assembly in the operative load carrying position;

FIGURE 5 is a fragmentary detailed view, on an enlarged scale, on line 5—5 of FIGURE 1, looking in the direction of the arrows;

Figure 1:
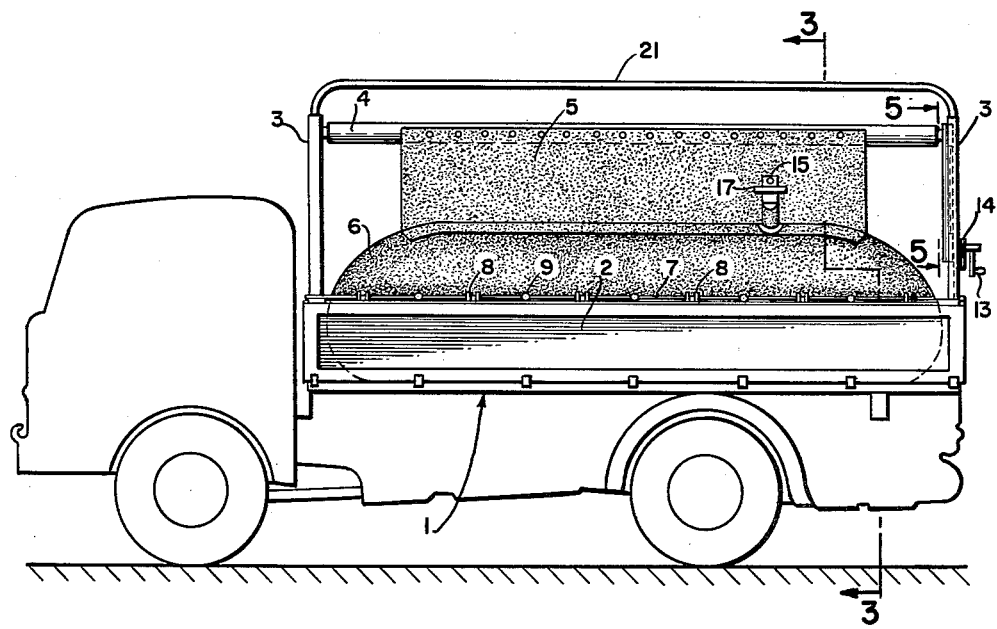
FIGURE 1 is a side elevational view of the vehicle showing the flexible tank in operative position.
Figure 2:
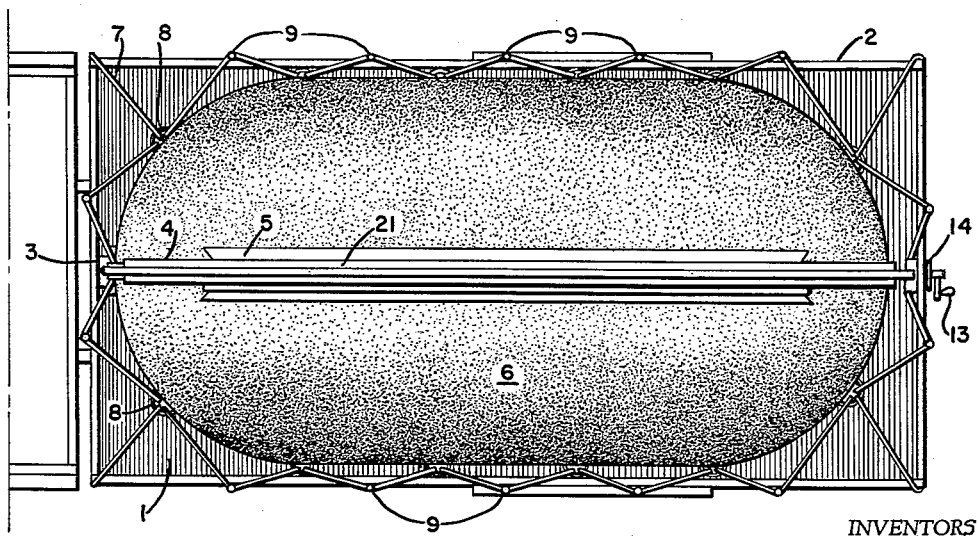
FIGURE 2 is a partial top plan view of the vehicle.
Figure 3:
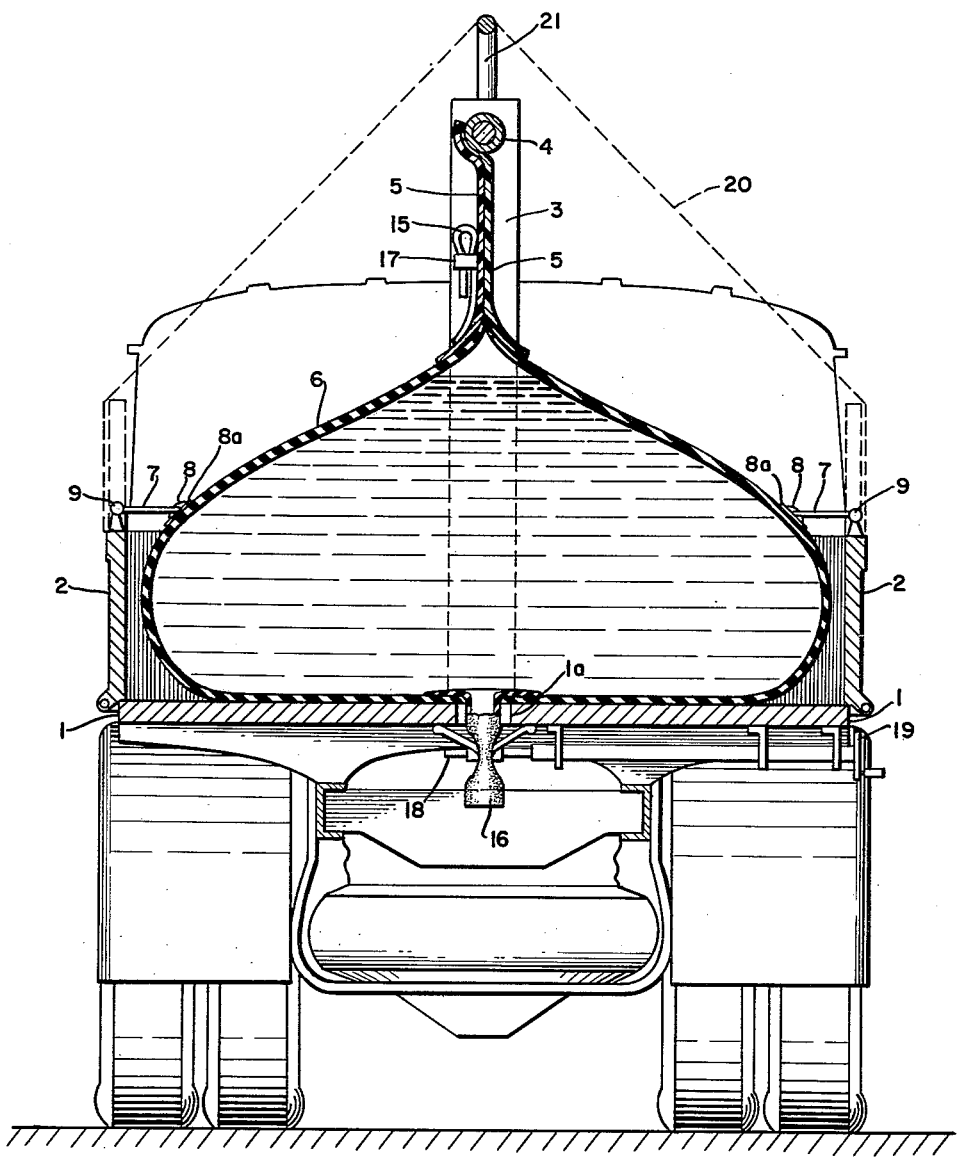
FIGURE 3 is a sectional view taken along the line 3—3 of FIGURE 1, looking in the direction of the arrows.
Figure 6:
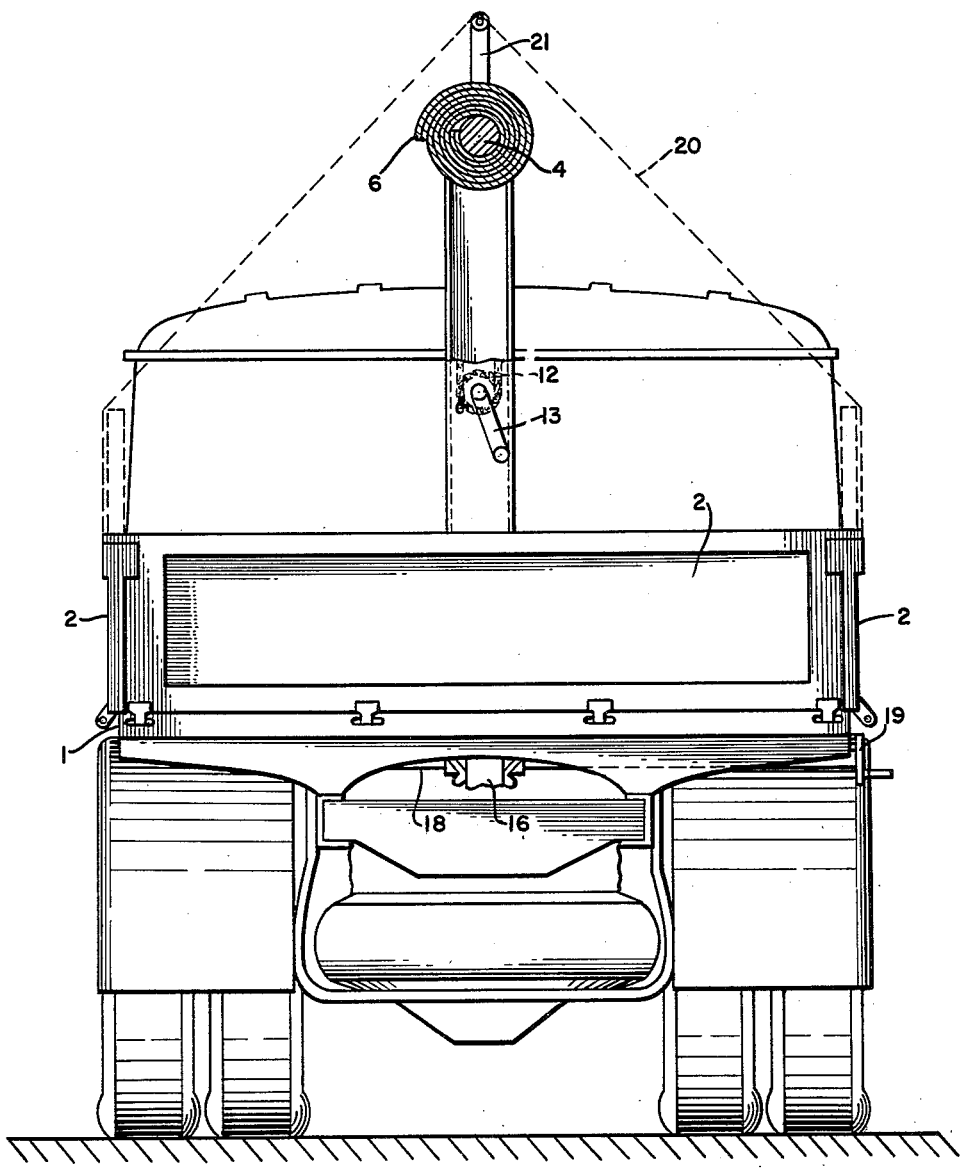
FIGURE 6 is a rear elevational view like FIGURE 4 showing the envelope of the tank taken up on the supporting roller.

The vehicle in accordance with the invention comprises a conventional body having a loading platform 1 limited by side boards 2. Rising from the platform is a structure comprising posts 3, rigidly fixed to the frame of the vehicle, and which support a roller 4 disposed above the platform.

A flexible envelope 6 constituting the tank for the transport of the liquid material is connected to said roller by means of a strip 5 having the shape of a fin.

The total length of the fin (which can also be formed of several portions) is such as to assure the maximum stability of the filled envelope; in the example given said length being equal to about ¾ of the total length of the envelope.

In its operative position, the envelope 6 fills the whole carrying space of the body. The envelope can be further secured by means of the elastic links 7 which engage with a plurality of fair-lead rings 8 fixed to and carried by the envelope 6. The rings 8 are secured to the envelope by the interposition of a reinforcing band 8a and are disposed along a horizontal periphery of said envelope. The links 7 engage moreover with a series of hooks 9 suitably disposed on the side boards 2 of the body.

In its inoperative position, the envelope 6 is taken up on the roller 4 and is raised with respect to the loading platform 1, means being provided to drag the roller into rotation. In the illustrated embodiment, said means comprise a pair of sprocket wheels 10 and 11 cooperating with a chain 12, the wheel 11 being driven for rotation by means of a crank 13 and being assembled on a shaft controlled by a ratchet gear 14.

Figure 7:
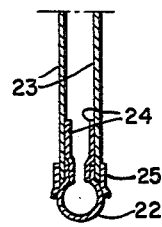
FIGURE 7 is a diagrammatic cross section, also on an enlarged scale, of the marginal seam of the two superimposed flat pieces of the flexible tank.

To allow the easy winding of the envelope 6 on the roller 4, said envelope is conveniently obtained by peripherally sealing two flat pieces 23 of flexible material facing each other and having a profile substantially rectilinear in their lower portions and arcuated at their sides in order to cause a gradual reduction in the width of the pieces, both towards the fin, to which they are fixed and firmly secured, and towards the base. The sealing of the edges of the pieces 23, as diagrammatically represented in FIGURE 7, is carried out by means of the strip 22 sealed at the interior of the edges and by means of inner butt straps 24 and outer butt straps 25.

The upper edges of the flat pieces 23 sealed to the fin 5 and the lower edge at the base are tapered in cross section to permit distribution along the roller during the taking up operation without an objectionable bulge when the adjacent lateral edges meet each other.

The above indicated structure of the envelope assures good taking up and paying out operations without the occurrence of folds which, displacing on the platform during the filling and/or the transport, could be the reason for rapid wear of the envelope. The empty envelope has a substantially flat shape and can be easily taken up, without the occurrence of folds, on the roller 4.

In the operative conditions, the envelope has a pear-like cross section comprising a base substantially extending for the whole width of the body and a lateral surface which progressively decreases upwardly as far as the strip 5 which connects the envelope to the roller 4.

The material constituting the envelope 6 is preferably composed of a layer of super-polyamide fabric suitably treated and rubberized. Said fabric, on the inner surface of the envelope, is covered with a layer of rubber of the type resistant to the action of hydrocarbons and, on the outer surface of the envelope, with another layer of rubber resistant also to the abrasion and to the atmospheric agents.

Preferably, the seams of the pieces of a fabric constituted as previously described are formed on the fabsic before curing in such a way as to obtain with a subsequent vulcanizing operation a perfectly sealed product, equivalent under all aspects to an entire fabric. However, it is also permissible to seal the various parts on vulcanized fabric.

The suspension strip or fin 5 is also fabricated from rubberized fabric.

According to the invention, the envelope 6, to be filled and emptied, is provided with at least two openings which, in the illustrated example, extend in the shape of two flexible hoses, respectively indicated as 15 and 16. The hose 15, used to fill the envelope, extends above the envelope and is closed by folding it and by locking it with a clamp 17. According to this method there is the advantage that the liquid poured from the top fills the envelope in an easy manner, without the need of pressure, as is the case with the conventional tanks at present in use.

The hose 16, used for the discharge, is carried by the bottom of the envelope, passes through a vent 1a formed in the platform 1 of the body, and is removably anchored to a fixed connection (not shown) to which the outer movable discharge tube is joined. A valve 18, of the pressure type, actuated by a handwheel 19, situated at one side of the body in an accessible position, acts on the flexible hose 16 to allow its opening and closing.

This discharging device, operating by gravity, is a further advantage of the invention and allows the complete draining of the liquid, which is facilitated by the simultaneous winding up of the envelope.

The truck in accordance with the invention is moreover provided with a tarpaulin 20 sustained by a longitudinal rod 21 supported in turn by the posts 3 of the supporting structure of the roller 4. Said tarpaulin, together with the side boards 2 of the body, contributes in protecting the envelope 6 against the possible damages during the transport and against the action of the atmospheric agents.

From what is said above, it clearly appears that the disposition of the parts characterizing the truck in accordance with the invention allows the most convenient use of the truck itself, which can be alternately adapted for the transport of liquids and for the transport of generic goods on account of the fact that the envelope 6, in the wound up condition, is not cumbersome with respect to the loading platform of the truck, the transport capacity of which is not reduced.

Moreover, in a truck in accordance with the invention, the presence of the anchoring means constituted by the strip 5 and by the links 7 avoids the oscillations of the load when the envelope is filled and permits therefore a safe and smooth travel of the vehicle.

A truck in accordance with the invention, instead of being provided with an individual tank connected to a single longitudinal roller as in the described example, can be provided with several tanks connected to parallel rollers, said rollers being disposed parallel to the longitudinal axis of the vehicle and/or transversely with respect to said axis.

According to the invention, the application of one or more flexible tanks as described above can be made also on other types of land or water vehicles.

Although it is thought that the invention and many of its resultant advantages will be understood from the foregoing description, it will be apparent that various changes may be made in the form, construction, and arrangement of parts, without departing from the spirit and scope of the invention or sacrificing the material advantages thereof, the apparatus disclosed being merely a preferred embodiment thereof.

What is claimed is:

1. In a vehicle adapted for transporting liquid or powdered materials and for transporting hard goods, said vehicle having a load bearing platform provided with upstanding side boards, a flexible envelope constituting a tank to receive said liquid or powdered materials and normally resting upon said platform, a supporting structure carried by said vehicle and being disposed above said platform, and means carried by said supporting structure to which said envelope is connected whereby said envelope may be rolled up to permit full use of the space formed by said platform and side boards to receive said hard goods.

2. A vehicle which can be used both for transporting liquid or powdered materials and for transporting hard goods, characterized in that it comprises a loading platform provided with side boards, a carrying structure able to support, at a level higher than that of the platform, at least one rotatable supporting roller to which a flexible envelope, forming a tank, is connected, said envelope resting during use on the platform and being wound up after use on the roller in order to allow the full use of the platform for the transport of said hard goods.

3. A vehicle as in claim 2, said envelope having an upper strip shaped as a fin, set parallel to the axis of the supporting roller and fastened to the latter.

4. A vehicle as in claim 3, having at least one envelope supported by a roller having its axis parallel to the longitudinal axis of the vehicle.

5. A vehicle as in claim 3, comprising a series of rotatable supporting rollers, said rollers being parallel with respect to the longtiudinal axis of the vehicle, and a flexible envelope constituting a tank connected to each roller.

6. A vehicle as in claim 5, including a plurality of fair-lead rings carried by said envelope and operatively connected to elastic links engaging a series of hooks suitably disposed on the side boards of the truck body, to fasten the envelope to said body.

7. A vehicle as in claim 6, said fair-lead rings being secured to the envelope by the interposition of a reinforcing band.

8. A vehicle as in claim 2, including means to drag into rotation the supporting roller of the envelope.

9. A vehicle as in claim 8, said means comprising a pair of sprocket wheels, one of which is keyed on the shaft of the roller and the other is keyed on a shaft driven for rotation by means of a crank and controlled by a ratchet gear, said wheels being connected to each other through a transmission device.

10. A vehicle as in claim 8, said envelope being obtained by peripherally sealing two pieces of flexible material facing each other and having an elliptical shape in cross section.

11. A vehicle as in claim 10, in which the flexible material comprises a central layer constituted by a superpolyamide rubberized fabric, an inner layer constituted by a material resistant to the action of the hydrocarbons, and an outer layer constituted by a material resistant also to wear and to atmospheric agents.

12. A vehicle as in claim 11, said pieces of flexible material being connected to each other by overlapped seals provided with butt straps on both faces, respectively towards the inside and the outside of the envelope, said seals being carried out on the material still in the uncured condition, and which is thereafter subjected to vulcanization.

13. A vehicle as in claim 12, said envelope comprising two openings for admitting and discharging the liquid which the envelope is intended to contain, said openings being provided with flexible hoses comprising closing means.

14. A vehicle as in claim 2, wherein the upper structure sustaining the supporting roller of the envelope comprises a longitudinal rod intended to support a tarpaulin covering the envelope to protect the latter against possible damages during the transport and against the action of the atmospheric agents.

References Cited in the file of this patent

UNITED STATES PATENTS

| | | |
|---|---|---|
| 2,712,797 | Woehrle | July 12, 1955 |
| 2,997,973 | Hawthorne et al. | Aug. 27, 1961 |
| 3,025,073 | Hickman | Mar. 13, 1962 |

FOREIGN PATENTS

| | | |
|---|---|---|
| 531,630 | Italy | Aug. 4, 1955 |
| 1,238,938 | France | July 11, 1960 |

OTHER REFERENCES

Newspaper: The Washington Post, Aug. 5, 1959, page B7, "Tank Made of Rubber-Coated Nylon."